United States Patent
Choi et al.

(10) Patent No.: US 8,703,085 B2
(45) Date of Patent: Apr. 22, 2014

(54) CRYSTALLINE CERIUM OXIDE AND PREPARATION METHOD OF THE SAME

(75) Inventors: Sang-Soon Choi, Daejeon (KR); Seung-Beom Cho, Daejeon (KR); Hyun-Chul Ha, Daejeon (KR); Ick-Soon Kwak, Daejeon (KR); Jun-Yeon Cho, Daejeon (KR)

(73) Assignee: LG Chem, Ltd., Seoul (KR)

( * ) Notice: Subject to any disclaimer, the term of this patent is extended or adjusted under 35 U.S.C. 154(b) by 427 days.

(21) Appl. No.: 13/044,144

(22) Filed: Mar. 9, 2011

(65) Prior Publication Data

US 2012/0000137 A1    Jan. 5, 2012

(30) Foreign Application Priority Data

Mar. 9, 2010  (KR) .................. 10-2010-0021004
Mar. 8, 2011  (KR) .................. 10-2011-0020559

(51) Int. Cl.
*C09K 13/00*    (2006.01)

(52) U.S. Cl.
USPC .............. 423/263; 51/309; 438/689; 516/89; 977/773; 977/896

(58) Field of Classification Search
USPC ................. 423/263, 21.1; 51/309; 438/689; 516/89; 977/773, 896
See application file for complete search history.

(56) References Cited

U.S. PATENT DOCUMENTS

| | | | |
|---|---|---|---|
| 2008/0236050 A1* | 10/2008 | Nho et al. .................. 51/298 |
| 2009/0047786 A1* | 2/2009 | Fukasawa et al. ........... 438/693 |
| 2010/0062687 A1* | 3/2010 | Oh et al. ..................... 451/41 |
| 2010/0072417 A1* | 3/2010 | Criniere .................... 252/79.1 |
| 2010/0143233 A1* | 6/2010 | Oh et al. .................. 423/419.1 |

FOREIGN PATENT DOCUMENTS

| | | |
|---|---|---|
| JP | 11-181403 A | 7/1999 |
| JP | 2004153286 A | 5/2004 |
| JP | 2004-168639 A | 6/2004 |
| JP | 2004168638 A | 6/2004 |
| JP | 2007051057 A | 3/2007 |
| JP | 2008-260673 A | 10/2008 |
| JP | 2010505735 A | 2/2010 |
| JP | 2010526433 A | 7/2010 |
| KR | 10-2005-0018975 A | 2/2005 |
| KR | 10-2005-0062637 A | 6/2005 |
| KR | 10-2009-0064566 A | 6/2009 |
| KR | 10-2010-0004181 A | 1/2010 |
| KR | 10-0962960 B1 | 6/2011 |
| WO | 2008/043703 * | 4/2008 |

OTHER PUBLICATIONS

International Search Report issued in International Application No. PCT/KR2011/001641 dated Nov. 23, 2011, 8 pages.

\* cited by examiner

*Primary Examiner* — Steven Bos
(74) *Attorney, Agent, or Firm* — Rothwell, Figg, Ernst & Manbeck, P.C.

(57) ABSTRACT

The present invention relates to crystalline cerium oxide prepared in a simple, economical, and efficient manner, of which crystal structure, shape, and size can be easily adjusted and that exhibits excellent polishing properties, and a preparation method thereof. The crystalline cerium oxide can be prepared as sub-micron crystalline cerium oxide that has a mean volume diameter and a diameter standard deviation within a predetermined range.

12 Claims, 6 Drawing Sheets

CRYSTALLINE CERIUM OXIDE AND PREPARATION METHOD OF THE SAME

FIELD OF THE INVENTION

The present invention relates to crystalline cerium oxide and a preparation method thereof, and more particularly, to crystalline cerium oxide prepared in a simple, economical, and efficient manner, of which crystal structure, shape, and size can be easily adjusted and that exhibits excellent polishing properties, and a preparation method thereof.

The present application claims priority to and the benefit of Korean patent applications No. 2010-0021004 filed in the Korea Intellectual Property Office on Mar. 9, 2010 and No. 2011-0020559 filed in the Korea Intellectual Property Office on Mar. 8, 2011, the entire content of which is incorporated hereinto by reference.

BACKGROUND OF THE INVENTION

Cerium oxide is a highly functional ceramic material that is widely used in catalysts, fluorescent substances, cosmetics, polishing agents, and the like, and has been recently spotlighted as an abrasive for use in an STI (Shallow Trench Isolation) process of a semiconductor device, and as an optical glass polishing agent.

Such cerium oxide can be generally prepared by a liquid-phase method, a gas-phase method, or a solid-phase method.

The liquid-phase method is a method of preparing cerium oxide directly from a trivalent or tetravalent cerium salt starting material by the addition of a pH adjuster such as ammonia. This method is advantageous in that raw material and equipment costs are low. However, a reaction between starting materials easily occurs from a nucleation step, making it difficult to control particle growth.

The gas-phase method is a method of preparing cerium oxide directly by vaporizing a cerium metal salt precursor and combining the vaporized precursor with oxygen, and is subdivided into a flame combustion decomposition method, a gas condensation decomposition method, a plasma decomposition method, a laser vaporization method, etc. However, this method has a difficulty in large scale production because a cerium metal salt precursor and equipment are expensive. Thus, studies on this method are still under progress.

Meanwhile, the solid-phase method is a method of preparing cerium oxide from a precursor material through a sintering process at a high temperature, and this method has been actively studied. As the precursor, cerium carbonate-based compounds are widely used, and the shape and size thereof greatly influence the properties and shape of cerium oxide prepared therefrom, thereby affecting physical properties such as diameter of abrasive particle and shape, as well as polishing rate, flatness, or generation of scratches during the CMP process for semiconductor devices. Therefore, in order to control the properties or shape of cerium oxide within the desired ranges, there is a need for a method of preparing cerium carbonate-based compounds to easily control their type or shape.

Conventionally, there have been methods for preparing cerium carbonate-based compounds using cerium salts such as cerium nitrate and precipitants such as urea. However, these synthetic methods are problematic in that a washing step is additionally required for removing organic by-products generated by the use of precipitants and a large amount of waste solution including ammonium ions can be generated even though the washing step is performed, and thus various tube lines in a reactor become clogged and operation of a stabilizer and a pressure gauge can be deteriorated.

In addition, the cerium salts such as cerium nitrate are prepared through a complicated process such as crystallization, solubilization, or purification after dissolution of cerium salt precursors in various acids, and are also expensive, resulting in inefficiency and economic disadvantage in the preparation process of cerium oxide. Moreover, when cerium oxide is prepared using cerium carbonate prepared by such synthetic method, the obtained cerium oxide may not manifest desired physical properties such as polishing property.

DISCLOSURE OF THE INVENTION

Technical Problem

The present invention provides crystalline cerium oxide prepared in a simple, economic, and efficient manner, of which crystal structure, shape, and size can be easily adjusted and that exhibits an excellent polishing property, and a cerium oxide slurry including the same.

Further, the present invention provides a method for preparing the crystalline cerium oxide.

Technical Solution

The present invention provides sub-micron crystalline cerium oxide having a mean volume diameter of about 70 to 120 nm and a diameter standard deviation of about 8 to 12.5 nm.

Further, the present invention provides a cerium oxide slurry including the crystalline cerium oxide as a polishing agent.

Furthermore, the present invention provides a method for preparing crystalline cerium oxide, including the steps of reacting lanthanite-(Ce) at 50° C. or higher to produce a cerium carbonate-based compound, heat-treating the cerium carbonate-based compound to produce cerium oxide, and pulverizing the cerium oxide.

Hereinafter, crystalline cerium oxide, a cerium oxide slurry, and a preparation method of crystalline cerium oxide according to one embodiment of the present invention will be described in more detail.

According to one embodiment of the present invention, sub-micron crystalline cerium oxide having a mean volume diameter of about 70 to 120 nm and a diameter standard deviation of about 8 to 12.5 nm is provided.

As used herein, "sub-micron" crystalline cerium oxide may be defined as crystalline cerium oxide, more particularly, cerium oxide particles constituting crystalline cerium oxide having a diameter of less than about 1 μm, namely, a nano-scale diameter. Such "sub-micron" crystalline cerium oxide contains fine nano-scale cerium oxide particles, and thus can be used as a polishing agent that is included in a polishing slurry during a chemical mechanical polishing (CMP) process in the fabrication process of a semiconductor device.

The present inventors found that sub-micron crystalline cerium oxide having a mean volume diameter and a diameter standard deviation within the above-described ranges can be obtained by a predetermined preparation method described below, thereby completing the present invention. In particular, such low standard deviation of cerium oxide has not been previously achieved, and cerium oxide having such low standard deviation as well as a nano-scale mean diameter has not been known. Since the crystalline cerium oxide has such properties, it exhibits a very fine, uniform diameter distribution, thereby showing an excellent polishing property. That is, the crystalline cerium oxide of one embodiment is used as a polishing agent in a CMP process, thereby achieving a better polishing rate and greatly reducing scratch generation on the surface of an object to be polished.

The properties of crystalline cerium oxide will be described in more detail as follows.

The crystalline cerium oxide of one embodiment may be prepared by pulverization of cerium oxide having specific properties that are prepared from a predetermined starting material, for example, lanthanite-(Ce). Specifically, FIGS. 11 and 12 show that cerium oxide before pulverization includes a plurality of cerium oxide particles, a boundary formed on each cerium oxide particle defines a plurality of crystal grains, and each crystal grain includes one or more cerium oxide crystals. Therefore, upon performing a typical pulverization method, the cerium oxide can be easily pulverized along the boundary, thereby making it possible to obtain crystalline cerium oxide powder with a more uniform and fine particle size.

Accordingly, when the crystalline cerium oxide is pulverized, it may have a finer diameter than prior cerium oxide, for example, a mean volume diameter of about 70 to 12 nm, preferably about 70 to 95 nm, and more preferably about 85 to 95 nm. In addition, the crystalline cerium oxide has a diameter standard deviation of about 8 to 12.5 nm, preferably about 8.5 to 12.5 nm, and more preferably about 9.0 to 12.3 nm, and therefore it has a very fine diameter that could not have been previously achieved. Since the crystalline cerium oxide has a fine and uniform diameter, it can be used as a polishing agent for a CMP slurry so as to achieve an excellent polishing property and minimize generation of microscratches when it is applied in the field of narrow-linewidth semiconductor device.

The mean volume diameter of the crystalline cerium oxide can be measured by a known typical method, for example, a laser scattering method, and a Horiba LA910 particle size analyzer can be used in this method. Further, the diameter distribution and diameter standard deviation of cerium oxide can also be measured using the Horiba LA910 in the same manner.

Further, the mean volume diameter and diameter standard deviation of the crystalline cerium oxide may be values that are measured after pulverizing cerium oxide having defined crystal grains using a vertical or horizontal type of mill. For pulverization of the crystalline cerium oxide, any known method used in the pulverization of cerium oxide may be used without limitation. Preferably, the vertical type of mill and the horizontal type of mill may be used singly or together, and it is more preferable that the two types of mills may be sequentially applied to make the diameter of cerium oxide uniform and the diameter distribution narrow. As a specific example of the pulverization method, about 1 to 10% by weight of cerium oxide aqueous slurry may be pulverized using a vertical type of mill (beads of about 0.3 mm applied, an agitation speed of about 300~800 rpm, and a feed rate of about 1~5 L/min) up to a mean diameter of about 1 μm, and then pulverized using a horizontal type of mill (beads of about 0.1 mm applied and an agitation speed of about 500~1300 rpm) up to the desired mean diameter.

Before the pulverization, the crystalline cerium oxide includes a plurality of cerium oxide particles, a boundary formed on each cerium oxide particle defines a plurality of crystal grains, and each crystal grain may include one or more cerium oxide crystals.

The term cerium oxide crystal means a solid-phase complete unit in which the components composing the cerium oxide have regularly repeated three-dimensional structures. The crystal can be defined by specific X-ray diffraction analysis, as known to an ordinarily-skilled person in the art.

Further, the term crystal grain means a microunit that composes a particle of cerium oxide and includes one or more cerium oxide crystals. That is, each crystal grain can be defined by a boundary formed on or inside the cerium oxide particle. The crystal grain and the boundary on crystal can be observed by SEM photography with respect to the crystalline cerium oxide, as shown in FIG. 11 or 12.

Namely, in the crystalline cerium oxide according to one embodiment of the present invention, boundaries formed on each cerium oxide particle define a plurality of crystal grains before pulverization, and thus the cerium oxide can be more easily pulverized along the boundary, resulting in crystalline cerium oxide powder with more uniform and fine diameter. The cerium oxide is able to show an excellent polishing property as a polishing agent of a CMP slurry due to its uniform and fine diameter. In addition, the pulverizing step of the cerium oxide can become simpler.

Since the boundary formed on the cerium oxide particle and the crystal grain defined by the boundary are included, the crystalline cerium oxide represents proper hardness. Thus, when the crystalline cerium oxide is used as a polishing agent of a CMP slurry, it shows an excellent polishing rate. In particular, the crystalline cerium oxide has an excellent polishing property compared to the conventional cerium oxide. Moreover, the crystalline cerium shows a better polishing rate compared to that of the cerium oxide that is prepared directly from lanthanite-(Ce) without passing through the cerium carbonate-based compound.

The crystalline cerium oxide of one embodiment of the present invention may have a mean volume diameter of about 0.5 um to 3 um before pulverization or immediately after production of cerium oxide by heat-treatment of a cerium carbonate-based compound. As the crystalline cerium oxide has such mean diameter in a dispersion state before pulverization, cerium oxide powder having a uniform diameter can be obtained by a simple pulverization process.

In the crystalline cerium oxide, crystal grain defined on the cerium oxide particle may have a size of about 20 to 300 nm, and preferably about 40 to 200 nm, before pulverization. Each cerium oxide crystal included in the crystal grain may have a size of about 10 to 200 nm, and preferably about 20 to 100 nm. More specifically, the crystal grain or crystal size may be controlled by a crystal structure of a cerium carbonate-based compound used for the preparation of cerium oxide. For example, in the cerium oxide prepared from a cerium carbonate-based compound with an orthorhombic crystal structure, namely, orthorhombic cerium oxycabonate hydrate, the crystal grain may have a size of about 50 to 130 nm. In the cerium oxide prepared from a cerium carbonate-based compound with a hexagonal crystal structure, namely, hexagonal cerium hydroxycarbonate, the crystal grain may have a size of about 60 to 200 nm.

Accordingly, the cerium oxide can be pulverized to produce crystalline cerium oxide having a more uniform and fine particle size, and thus it can be used as a polishing agent of a CMP slurry to achieve an excellent polishing property.

Meanwhile, according to another embodiment of the present invention, a CMP slurry including the above described crystalline cerium oxide of one embodiment as a polishing agent can be provided. Since the crystalline cerium oxide has a uniform and fine particle size and a narrow diameter distribution, the CMP slurry is able to show an excellent polishing property. For example, the CMP slurry is able to show an excellent polishing rate and reduce scratch generation on the surface of an object to be polished.

The CMP slurry may further include a dispersant and a pH adjuster.

The dispersant may be a non-ionic polymer dispersant or an anionic polymer dispersant. The non-ionic polymer dispersant may be one or more selected from the group consisting of polyvinyl alcohol (PVA), ethylene glycol (EG), glycerin, polyethylene glycol (PEG), polypropylene glycol (PPG), and polyvinyl pyrrolidone (PVP), and the anionic polymer dispersant may be one or more selected from the group consisting of polyacrylic acid, ammonium polyacrylate, and polyacrylic maleic acid. However, the scope of the present invention is not limited thereto, and any known dispersant applied to a cerium oxide slurry for CMP may be used without limitation.

The dispersant may be used in an amount of about 0.001 to 10 parts by weight, and preferably about 0.02 to 3.0 parts by weight, based on 100 parts by weight of cerium oxide. If the content of dispersant is less than about 0.001 parts by weight, rapid precipitation will occur due to low dispersibility, so that the polishing agent cannot be supplied uniformly due to the precipitation occurring during transport of the polishing slurry. On the other hand, if the content of dispersant is more than about 10 parts by weight, a dispersant polymer layer functioning as a cushioning layer may be thickly formed around particles of the polishing agent, thereby making it difficult to allow the polishing agent to contact a polishing surface, resulting in a drop in the polishing rate.

After mixing cerium oxide with the dispersant in water, the pH of the CMP slurry is preferably adjusted to pH 6 to 8. For the pH adjustment, the cerium oxide slurry may further include a pH adjuster. The pH adjuster may be a basic pH adjuster such as potassium hydroxide, sodium hydroxide, ammonia, bidium hydroxide, cesium hydroxide, sodium bicarbonate, or sodium carbonate, or an acidic pH adjuster such as hydrochloric acid, nitric acid, sulfuric acid, phosphoric acid, formic acid, or acetic acid. When a strong acid or base among them is used, it is diluted with deionized water to prevent slurry agglomeration due to an abrupt pH change. However, the pH adjuster is not limited thereto, and any pH adjuster applicable to the cerium oxide slurry composition may be used without limitation. The content of the pH adjuster may be determined by those skilled in the art, considering a proper pH of the slurry composition.

After pH titration, a dispersion stabilization process is preferably conducted in order to improve dispersion and storage stability. The dispersion stabilization process may be performed using a dispersion system generally known in the art. For example, when a vertical type of mill is used, the dispersion stabilization step may be performed at a dispersion feed rate of approximately 1000~5000 ml/min and a bead agitation speed of approximately 300~800 rpm. When a horizontal type of mill is used, the dispersion stabilization step may be performed at a dispersion feed rate of approximately 5000~17000 ml/min and a bead agitation speed of approximately 400~1200 rpm. When the pulverization process is simply performed under these typical conditions, a polishing agent including cerium oxide powder with a more uniform and fine diameter and a CMP slurry including the same can be obtained.

Meanwhile, according to still another embodiment of the present invention, a method for preparing crystalline cerium oxide is provided, including the steps of reacting lanthanite-(Ce) at 50° C. or higher to produce a cerium carbonate-based compound, heat-treating the cerium carbonate-based compound to produce cerium oxide, and pulverizing the cerium oxide. In this regard, the cerium carbonate-based compound encompasses a cerium carbonate-based compound with an orthorhombic crystal structure, namely, orthorhombic cerium oxycabonate hydrate ($Ce_2O(CO_3)_2 \cdot H_2O$), and a cerium carbonate-based compound with a hexagonal crystal structure, namely, hexagonal cerium hydroxycarbonate ($Ce(OH).(CO_3)$).

The known preparation method of the cerium carbonate-based compound is generally to prepare the cerium carbonate-based compound by largely reacting cerium salt such as cerium nitrate with urea in an aqueous solvent. According to this preparation method, as summarized in the following Reaction Scheme 1, urea is heat-decomposed to form ammonia or an ammonium salt thereof, and carbon dioxide or a carbonate thereof. The produced carbon dioxide or carbonate thereof reacts with cerium salt or cerium ions derived from the cerium salt to give a cerium carbonate-based compound that can be used as a cerium oxide precursor. In the process, if the reaction temperature is low, cerium oxycabonate hydrate ($Ce_2O(CO_3)_2 \cdot H_2O$) with an orthorhombic crystal structure can be obtained as the cerium carbonate-based compound. If the reaction temperature is high, a part of the cerium salt or cerium ions is hydrolyzed and then participates in the reaction to produce cerium hydroxycarbonate ($Ce(OH).(CO_3)$) with a hexagonal crystal structure. It has been generally known that the physical properties and shape of cerium oxide obtained from the cerium carbonate-based compound are dependent on the kind of precursor selected from orthorhombic cerium oxycabonate hydrate ($Ce_2O(CO_3)_2 \cdot H_2O$) or hexagonal cerium hydroxycarbonate ($Ce(OH).(CO_3)$), or the size, shape, and content of the precursor compound.

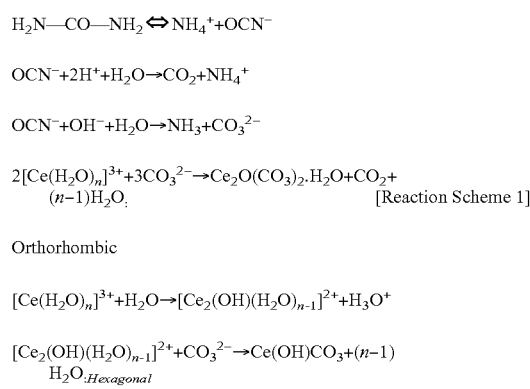

[Reaction Scheme 1]

However, various gases are generated in urea pyrolyis according to the known method, and thus the reaction pressure may greatly increase during the process of preparing the cerium carbonate-based compound. In particular, a high temperature and high pressure are required for preparing the hexagonal cerium hydroxycarbonate ($Ce(OH).(CO_3)$), which makes it difficult to selectively prepare the hexagonal compound.

In addition, it has been reported that various side reactions, as well as the formation of ammonia and carbon dioxide in the urea pyrolysis, produce different organic by-products (Thermochmica Acta 424 (2004) 131-142). As a result, the aforementioned preparation method requires a washing step for removing the organic by-products after the production of the cerium carbonate-based compound. In the washing step, a large amount of waste solution including ammonium ions can be generated.

That is, the known method of preparing a cerium carbonate-based compound using cerium salt and urea has considerable difficulties in preparing the cerium carbonate-based compound with desired crystal structure, size, or shape, and also has a complicated preparation process. Further, there are considerable difficulties in preparing cerium oxide with a desired crystal structure, size, or shape from the cerium carbonate-based compound, and its particles are also not uniform.

Therefore, the present inventors found that lanthanite-(Ce) is reacted under the specific conditions to produce a cerium carbonate-based compound with a controlled crystal structure, shape, and type, and the obtained cerium carbonate-based compound is heat-treated and pulverized to produce crystalline cerium oxide having a more uniform and fine diameter and a lower diameter standard deviation, compared to the known cerium oxide, thereby completing the present invention.

Accordingly, the method of still another embodiment of the present invention does not generate problems of the known process that employs a precipitant or an excessive amount of solvent to generate a risk or by-products, and does not require expensive raw materials or a high temperature and high pressure, thereby improving economic efficiency of the process. Further, since the crystalline cerium oxide according to one embodiment of the present invention has a proper particle shape and size and a narrow particle distribution, it can be used as a polishing agent of a CMP slurry so as to achieve an excellent polishing property and minimize generation of micro-scratches when it is applied in the field of narrow-linewidth semiconductor device.

Meanwhile, according to still another embodiment of the present invention, lanthanite-(Ce) as a staring material is only reacted at about 50° C. or higher without use of urea to produce orthorhombic cerium oxycabonate hydrate ($Ce_2O(CO_3)_2.H_2O$), hexagonal cerium hydroxycarbonate ($Ce(OH)CO_3$)), or mixtures thereof. The crystal structure, size, or shape of the cerium carbonate-based compound can be easily controlled by regulating the reaction conditions, for example reaction temperature or reaction time, thereby producing the cerium carbonate-based compounds without concern about an excessive increase in the reaction pressure.

Specifically, even if the cerium carbonate-based compound of hexagonal cerium hydroxycarbonate ($Ce(OH).CO_3$)) is intended to be produced, the reaction can proceed at a high temperature without concern about the high reaction pressure caused by urea pyrolysis, so as to produce the cerium carbonate-based compound with the controlled crystal structure, size, or shape as desired. In addition, the washing step to remove the organic by-products is substantially not required, because urea or the like is not used, thereby simplifying the production process and avoiding generation of an organic waste solution due to the washing step.

Meanwhile, lanthanite-(Ce) has a chemical formula of $(Ce,La)_2(CO_3)_3.8(H_2O)$, and is a kind of known cerium compounds. It is known that it can be obtained from natural sources. The cerium salts such as cerium nitrate used for preparing the cerium carbonate-based compound in the art are obtained by crystallization and purification after dissolution of lanthanite-(Ce) as a starting material in acid. Therefore, the cerium salt is usually more expensive than lanthanite-(Ce). In the preparation method according to one embodiment of the present invention, the cerium carbonate-based compound can be directly obtained from lanthanite-(Ce), instead of relatively expensive cerium salts such as cerium nitrate, thereby producing the cerium carbonate-based compound applicable as a cerium oxide precursor in an economical and efficient manner.

The reaction of lanthanite-(Ce) can be performed without any kind of separate medium, but is preferably performed in a liquid-phase medium. The water molecules contained in lanthanite-(Ce) function as a reaction medium because lanthanite-(Ce) exists in a form of a hydrate. However, it is preferable that the reaction is performed in the liquid-phase medium in order to increase the reactivity of lanthanite-(Ce) at the elevated temperature.

The liquid-phase medium may be any aqueous solvent or organic solvent, as long as it is able to dissolve or disperse lanthanite-(Ce). The type of the liquid-phase medium is not particularly limited, but may be exemplified by water or water-miscible aqueous solvents such as alcohol, DMF or DMSO. In terms of the reactivity of lanthanite-(Ce) or easy removal of solvent after reaction, water or aqueous solvent including the same is preferred.

The reaction of lanthanite-(Ce) may be conducted in a liquid-phase medium at a weight ratio of lanthanite-(Ce) to liquid-phase medium of about 1:0.5 to 1:20, preferably about 1:1 to 1:10, or more preferably about 1:2 to 1:9. If the amount of liquid-phase medium is excessively small with respect to that of lanthanite-(Ce), lanthanite-(Ce) cannot be sufficiently dissolved or dispersed, thereby negatively affecting the reactivity. In addition, it is difficult to feed the reactant into a reactor. Moreover, the reaction of lanthanite-(Ce) includes a process in which the particles dissolved or dispersed in a liquid-phase medium form crystals of a cerium carbonate-based compound. Thus, if the amount of the liquid-phase medium is too small, a cerium carbonate-based compound with non-uniform properties may be produced. On the other hand, if the amount of the liquid-phase medium is excessively large, the productivity can be adversely decreased.

Meanwhile, lanthanite-(Ce) is reacted at about 50° C. or higher to produce a cerium carbonate-based compound, for example, orthorhombic cerium oxycabonate hydrate ($Ce_2O(CO_3)_2.H_2O$), hexagonal cerium hydroxycarbonate ($Ce(OH).CO_3$)), or a mixture thereof.

The reaction of lanthanite-(Ce) may be conducted at a temperature of about 50 to 300° C. If the reaction temperature is less than about 50° C., the reaction time increases to reduce the productivity. On the other hand, if the reaction temperature is too high, lanthanite-(Ce) may be directly converted into cerium oxide without passing through the cerium carbonate-based compound stage. Such cerium oxide has a wide diameter distribution, and thus is not suitable for a CMP slurry. In addition, if the reaction temperature is too high, the reaction pressure increases additionally because of high vapor pressure caused by the aqueous solvent used in the reaction. Thus, the high pressure requires an expensive manufacturing apparatus and causes a dangerous problem.

Meanwhile, in the preparation method according to still another embodiment of the present invention, the crystal structure, size, or shape of the reaction product, the cerium carbonate-based compound, can be easily controlled by regulating the reaction conditions of lanthanite-(Ce).

As examples, the production degree of the cerium carbonate-based compounds with different crystal structures, namely, orthorhombic cerium oxycabonate hydrate ($Ce_2O(CO_3)_2.H_2O$) or hexagonal cerium hydroxycarbonate ($Ce(OH).CO_3$)), can be controlled by regulating the reaction temperature, reaction time, or amount of liquid-phase medium.

The reaction of lanthanite-(Ce) is conducted at a temperature of about 50 to 130° C. to produce the cerium carbonate-based compound including orthorhombic cerium oxycabonate hydrate ($Ce_2O(CO_3)_2.H_2O$). The production degree of orthorhombic cerium oxycabonate hydrate ($Ce_2O(CO_3)_2.H_2O$) can be controlled by regulating the reactions conditions such as reaction temperature or reaction time within the temperature ranges.

For example, the reaction of lanthanite-(Ce) is performed at about 50° C. or higher to lower than 110° C. to produce a cerium carbonate-based compound including about 50 vol % of orthorhombic cerium oxycabonate hydrate ($Ce_2O(CO_3)_2 \cdot H_2O$) among the produced cerium carbonate-based compounds. In addition, even if the reaction is performed at a temperature of about 110 to 130° C., a cerium carbonate-based compound including about 50 vol % or more of orthorhombic cerium oxycabonate hydrate ($Ce_2O(CO_3)_2 \cdot H_2O$) among the produced cerium carbonate-based compounds can be prepared by reducing the reaction time or regulating the weight ratio of lanthanite-(Ce) to liquid-phase medium at less than about 1:5, and preferably about 1:0.5 or more and less than 1:5.

According to another example of the present invention, the reaction of lanthanite-(Ce) is performed at a temperature of about 110 to 130° C., a cerium carbonate-based compound including hexagonal cerium hydroxycarbonate ($Ce(OH) \cdot CO_3$)) can be produced, and the production degree of hexagonal cerium hydroxycarbonate ($Ce(OH) \cdot CO_3$)) can be controlled by regulating the reaction conditions such as reaction temperature within the range or reaction time.

For example, the reaction of lanthanite-(Ce) is performed at about 130° C. or higher to lower than 300° C. to produce a cerium carbonate-based compound including about 50 vol % or more of hexagonal cerium hydroxycarbonate ($Ce(OH) \cdot CO_3$)) among the produced cerium carbonate-based compounds. In addition, even if the reaction is performed at a temperature of about 110 to 130° C., a cerium carbonate-based compound including about 50 vol % or more of hexagonal cerium hydroxycarbonate ($Ce(OH) \cdot CO_3$)) among the produced cerium carbonate-based compounds can be prepared by relatively increasing the reaction time or regulating the weight ratio of lanthanite-(Ce) to liquid-phase medium at about 1:5 or more, and preferably about 1:5 to 1:20.

According to the same or a similar method to the aforementioned method, the reaction conditions are regulated to easily produce the cerium carbonate-based compounds with desired crystal structure, size, or shape, thereby producing cerium oxide having desired physical properties, shape, or size from the cerium carbonate-based compounds.

Meanwhile, the reaction pressure of lanthanite-(Ce) is not particularly limited, but the reaction may be performed, for example, at atmospheric pressure (about 1 bar) to 100 bar. The reaction pressure means the pressure of the reaction system, when the reaction of lanthanite-(Ce) is initiated. As described above, urea is not used in the preparation method according to one embodiment of the present invention, and thus a gaseous product is not formed, thereby reducing the additional increase of reaction pressure.

Further, the reaction of lanthanite-(Ce) may be performed for about 0.5 to 100 hours, and preferably about 0.5 to 48 hours. The cerium carbonate-based compound being applicable as a cerium oxide precursor, such as orthorhombic cerium oxycabonate hydrate ($Ce_2O(CO_3)_2 \cdot H_2O$) or hexagonal cerium hydroxycarbonate ($Ce(OH) \cdot CO_3$)), can be prepared with good efficiency by reacting lanthanite-(Ce) at the elevated temperature for such reaction time. Such reaction time can prevent the by-products such as cerium oxide with poor properties that are produced due to an excessively long reaction time.

Meanwhile, the step of forming a cerium carbonate-based compound may further include the step of drying a reaction product. In one embodiment of the present invention, since only lanthanite-(Ce) and a liquid-phase medium such as water are fed, an additional washing step is not required after completion of the reaction, and thus the product can be directly dried during the heating process. Therefore, in one embodiment of the present invention, waste water or a waste solution is not generated during a washing step or reaction process.

In still another embodiment of the present invention, the cerium carbonate-based compound is heat-treated at about 300 to 1500° C. to produce cerium oxide. The heat-treatment may be performed by the known method that is generally used for the preparation of cerium oxide, and may include the step of heat-treatment at about 300° C. to 1500° C., about 350° C. to 1000° C., or about 400° C. to 1000° C. for about 30 minutes ~4 hours. If the heat-treatment is performed at an excessively low temperature or for an excessively short time, the cerium oxide is not sufficiently crystallized, and thus it may not show a polishing performance such as the preferred polishing rate when used as a polishing agent of CMP slurry. On the other hand, if the heat-treatment is performed at an excessively high temperature or for an excessively long time, the cerium oxide is excessively crystallized, leading to scratch generation on the surface of an object to be polished when used as a polishing agent. Such heat-treatment may be performed using a rotary kiln or box furnace.

Further, in still another embodiment of the present invention, the step of pulverizing the heat-treated cerium oxide may be included. Before pulverization, the crystalline cerium oxide obtained by the preparation method of still another embodiment of the present invention was found to have novel crystal properties, in which it includes a plurality of cerium oxide particles, and a boundary formed on each cerium oxide particle defines a plurality of crystal grains and each crystal grain includes one or more cerium oxide crystals, which is distinct in that a boundary or a crystal grain defined thereby is not observed in the cerium oxide particles obtained by the prior method. As described above, according to still another embodiment of the present invention, the crystalline cerium oxide including a plurality of cerium oxide particles can be obtained before pulverization, in which a boundary formed on each cerium oxide particle defines a plurality of crystal grains.

When the cerium oxide satisfying such properties is pulverized, crystalline cerium oxide powder with a more uniform and fine particle size can be obtained, and the cerium oxide is used as a polishing agent to improve the polishing property and simplify the pulverization process, which was previously described and thus a detailed description thereof will be omitted.

In the pulverization step, a vertical type of mill and a horizontal type of mill are used singly or together, and it is preferable that the two types of mills are sequentially applied to make the diameter of cerium oxide uniform and the diameter distribution narrow. The order of the vertical type of mill and the horizontal type of mill can be properly determined by those skilled in the art, considering the pulverization conditions or the properties of polishing particles. Even though various dispersion methods are applied to the conventional method of preparing cerium oxide from cerium salts, there is a limit to the improvement of diameter distribution. However, in the cerium oxide prepared according to still another embodiment of the present invention, a boundary formed on each cerium oxide particle defines a plurality of crystal grains before pulverization, and thus the cerium oxide can be easily pulverized along the boundary, thereby making it possible to obtain cerium oxide powder with a more uniform and fine particle size.

The Effect of the Invention

According to the present invention, crystalline cerium oxide prepared in a simple, economical, and efficient manner, of which crystal structure, shape, and size can be easily adjusted and that exhibits an excellent polishing property, and a preparation method thereof are provided.

DETAILED DESCRIPTION OF THE EMBODIMENTS

Figure 1:
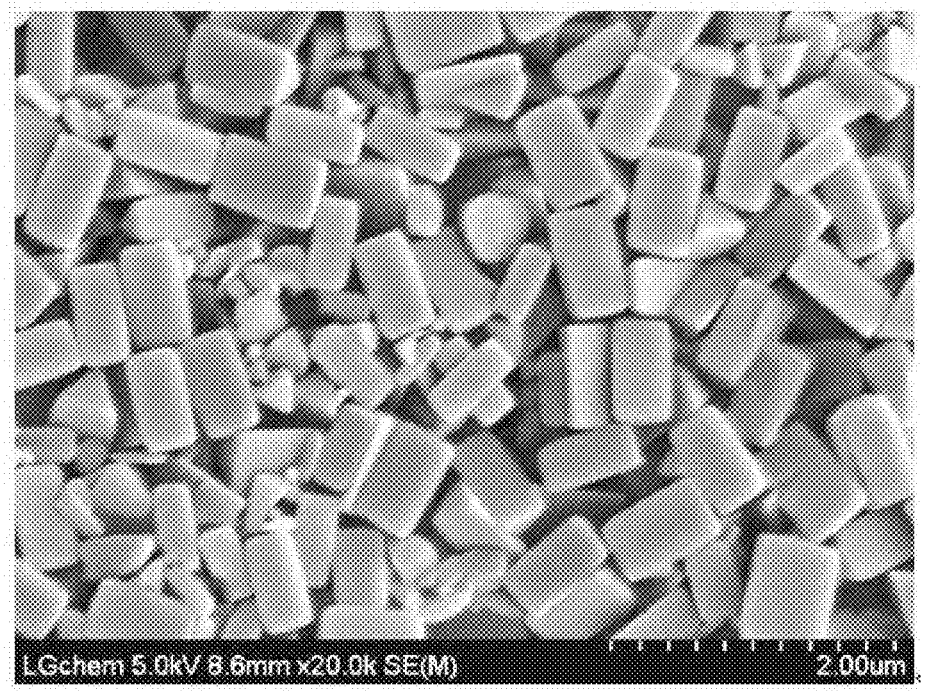
FIG. 1 is an electron microscope photograph of the cerium carbonate-based compound prepared in Example 1.
Figure 2:
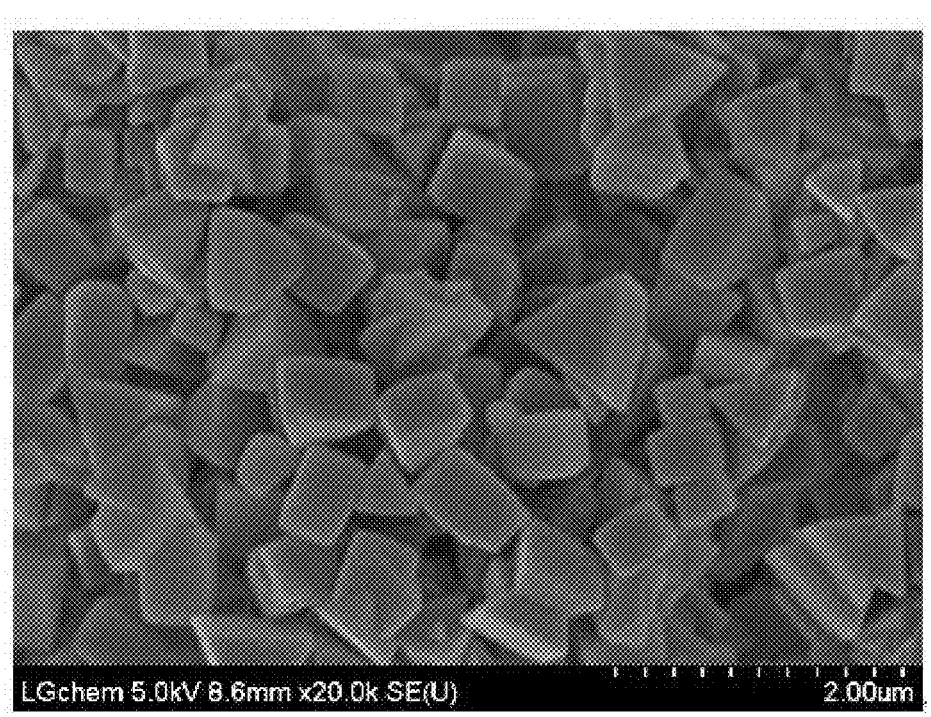
FIG. 2 is an electron microscope photograph of the cerium carbonate-based compound prepared in Example 2.
Figure 3:
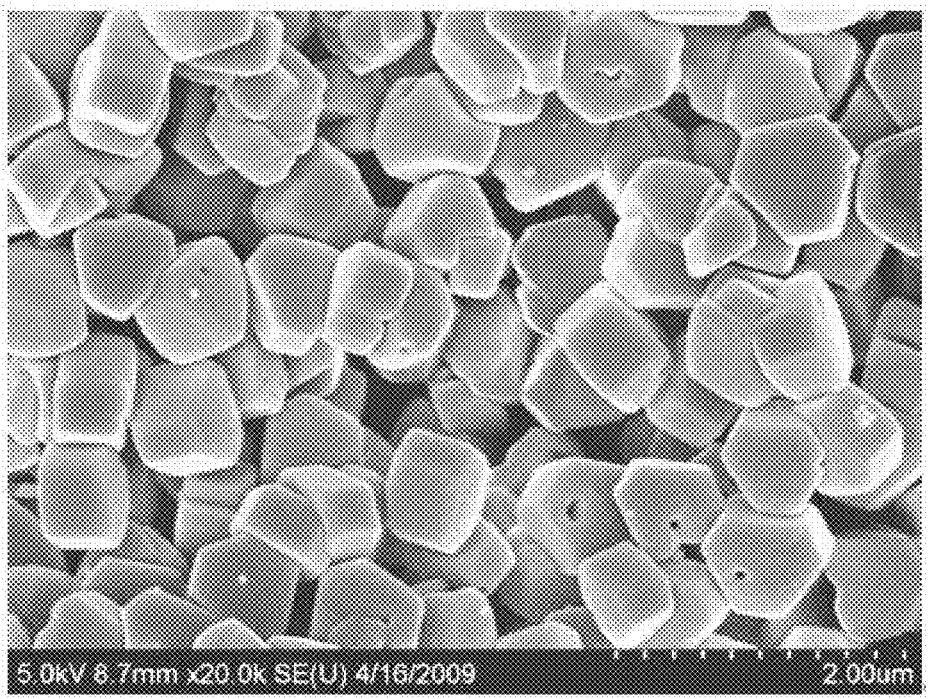
FIG. 3 is an electron microscope photograph of the cerium carbonate-based compound prepared in Comparative Example 1.
Figure 4:
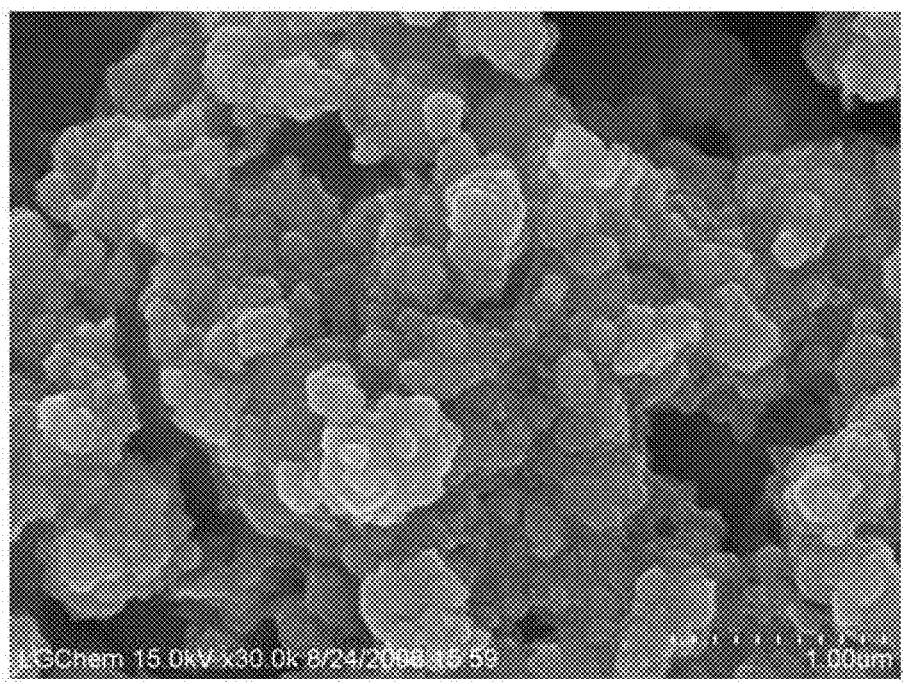
FIG. 4 is an electron microscope photograph of the cerium carbonate-based compound prepared in Comparative Example 2.
Figure 5:
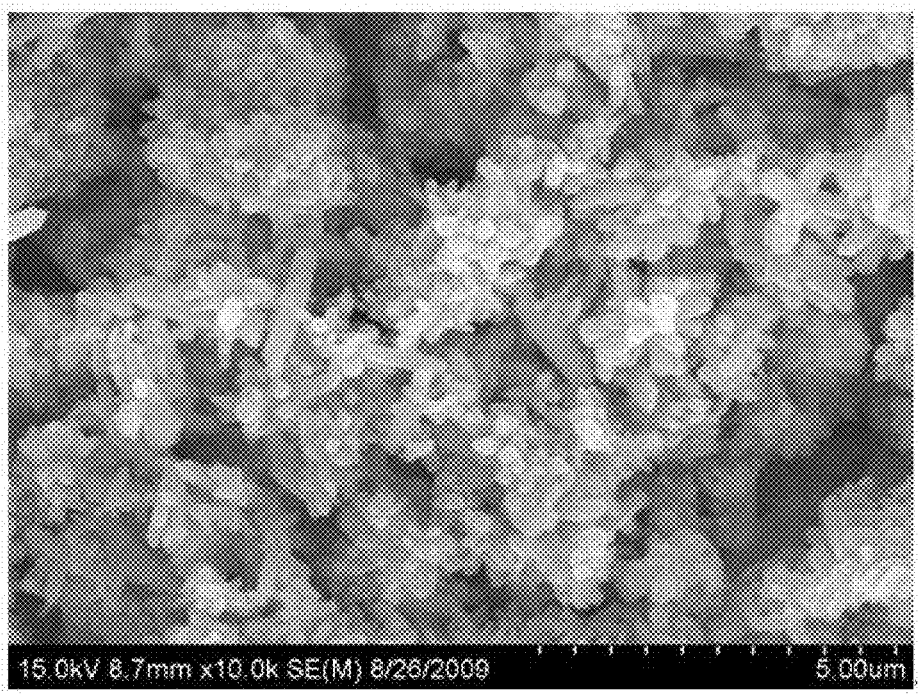
FIG. 5 is an electron microscope photograph of the cerium carbonate-based compound prepared in Example 3.
Figure 6:
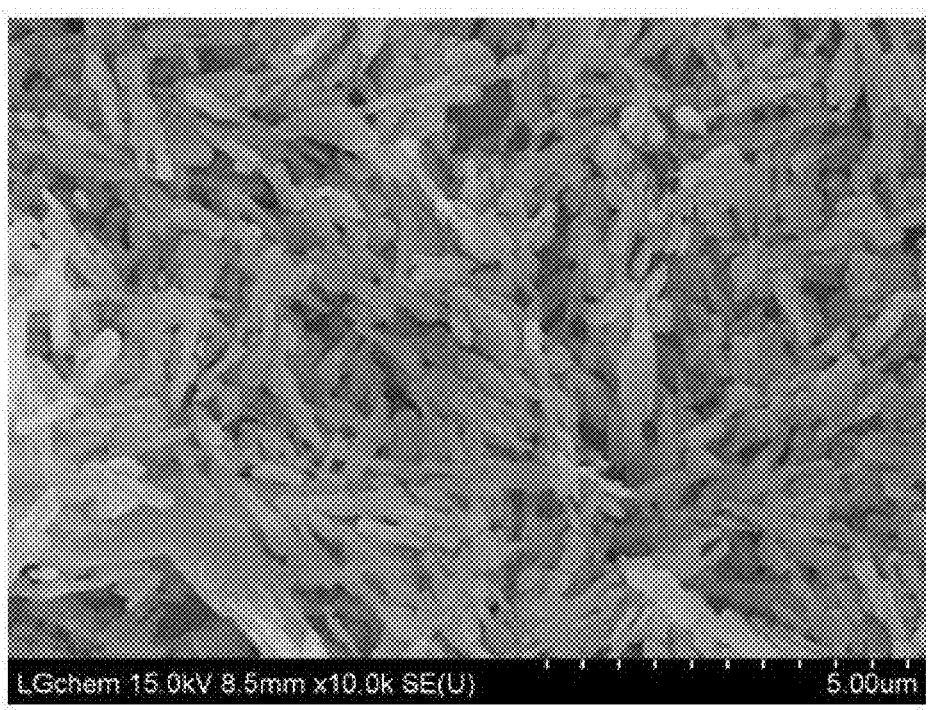
FIG. 6 is an electron microscope photograph of the cerium carbonate-based compound prepared in Example 4.

Hereinafter, the actions and effects of the present invention will be described in more detail with reference to the specific Examples. However, these examples are illustrative only and the scope of the invention is not limited thereto.

Preparation of Cerium Oxide

Example 1

Preparation of Cerium Carbonate-Based Compound and Crystalline Cerium Oxide 23 kg of lanthanite-(Ce) was dispersed in 140 kg of distilled water at atmospheric pressure (1 atm) and room temperature. The dispersed solution was reacted for 2 hours in a reactor that was heated to 180° C. Subsequently, the reaction product was dried using a spray dryer to obtain a cerium carbonate-based compound.

The cerium carbonate-based compound was heat-treated in a rotary kiln at 900° C. to obtain cerium oxide.

10 kg of the prepared cerium oxide and 150 g of dispersant were added to 90 kg of distilled water with agitation, and pulverized using a vertical type of mill (APEX mill, manufactured by Kotobuki, Japan, 0.3 mm beads applied, agitation speed of 300~800 rpm, feed rate of 1~5 L/min) to a size of 1 μm, and then pulverized using a horizontal type of mill (ZRS10 mill, manufactured by Netzsch, German, 0.1 mm beads applied, agitation speed of 500~1300 rpm).

Example 2

Preparation of Cerium Carbonate-Based Compound and Cerium Oxide

A cerium carbonate-based compound and cerium oxide were obtained in the same manner as in Example 1, except for using 70 kg of lanthanite-(Ce).

Example 3

Preparation of Cerium Carbonate-Based Compound and Cerium Oxide

A cerium carbonate-based compound and cerium oxide were obtained in the same manner as in Example 1, except that 70 kg of lanthanite-(Ce) was dispersed in 140 kg of distilled water, and the dispersed solution was maintained for 3 hours in a reactor heated to 80° C., and then maintained for 1 hour in a reactor heated to 130° C.

Example 4

Preparation of Cerium Carbonate-Based Compound and Cerium Oxide

A cerium carbonate-based compound and cerium oxide were obtained in the same manner as in Example 1, except that 70 kg of lanthanite-(Ce) was dispersed in 140 kg of distilled water, and the dispersed solution was maintained for 24 hours in a reactor heated to 80° C.

Comparative Example 1

Preparation of Cerium Carbonate-Based Compound and Cerium Oxide

Solution 1 prepared by dissolving 69 kg of cerium nitrate in 32 kg of distilled water at room temperature and Solution 2 prepared by dissolving 35 kg of the precipitant urea in 32 kg of distilled water at room temperature were added to a reactor and mixed, and then reacted for 2 hours in a reactor heated to 180° C.

After completion of the reaction, the resultant was transferred into a container, the supernatant was removed, and an equal amount of distilled water was added thereto, followed by agitation. These procedures of removing supernatant, adding distilled water, and agitation were repeated until the ionic conductivity became 1 ms or less.

After completion of the washing step, the resultant was dried using a spray dryer to obtain a cerium carbonate-based compound.

The cerium carbonate-based compound was heat-treated in a rotary kiln at 900° C. to obtain cerium oxide.

10 kg of the prepared cerium oxide and 150 g of dispersant were added to 90 kg of distilled water with agitation, and pulverized using a vertical type of mill (APEX mill, manufactured by Kotobuki, Japan, 0.3 mm beads applied, agitation speed of 300~800 rpm, feed rate of 1~5 L/min) to a size of 1 μm, and then pulverized using a horizontal type of mill (ZRS10 mill, manufactured by Netzsch, German, 0.1 mm beads applied, agitation speed of 500~1300 rpm).

Comparative Example 2

Preparation of Cerium Carbonate-Based Compound and Cerium Oxide 43.4 kg of cerium nitrate and 18 kg of urea were mixed at atmospheric pressure (1 atm) and room temperature, and then reacted for 16 hours in a reactor that was heated to 140° C. Subsequently, the resultant was slowly cooled and diluted with water, leading to termination of the reaction, and then dried under vacuum at 80° C. for 24 hours to obtain a cerium carbonate-based compound.

The cerium carbonate-based compound was heat-treated in a rotary kiln at 900° C. to obtain cerium oxide.

10 kg of the prepared cerium oxide and 150 g of dispersant were added to 90 kg of distilled water with agitation, and pulverized using a vertical type of mill (APEX mill, manufactured by Kotobuki, Japan, 0.3 mm beads applied, agitation speed of 300~800 rpm, feed rate of 1~5 L/min) to a size of 1 μm, and then pulverized using a horizontal type of mill (ZRS10 mill, manufactured by Netzsch, German, 0.1 mm beads applied, agitation speed of 500~1300 rpm).

Comparative Example 3

Preparation of Cerium Oxide by Direct Heat-Treatment of Lanthanite-(Ce)

Lanthanite-(Ce) was heat-treated in a rotary kiln at 900° C. to obtain cerium oxide.

10 kg of the prepared cerium oxide and 150 g of dispersant were added to 90 kg of distilled water with agitation, and pulverized using a vertical type of mill (APEX mill, manufactured by Kotobuki, Japan, 0.3 mm beads applied, agitation speed of 300~800 rpm, feed rate of 1~5 L/min) to a size of 1 μm, and then pulverized using a horizontal type of mill (ZRS10 mill, manufactured by Netzsch, German, 0.1 mm beads applied, agitation speed of 500~1300 rpm).

The physical properties of cerium carbonate-based compounds and crystalline cerium oxide prepared in Examples 1 to 4 and Comparative Examples 1 to 3 were analyzed by the following method, and the results are summarized in Table 1.

First, the crystal structure and shape of cerium carbonate-based compounds and cerium oxide were analyzed as follows.

XRD analysis and SEM analysis on the cerium carbonate-based compounds and cerium oxide obtained in Examples 1 to 4 and Comparative Examples 1 to 3 were performed to analyze their crystal structure and shape. A Bruker D4 Endeavor was used in XRD analysis, and a HITACHI S-4800 was used in SEM analysis.

(1) XRD Data

Figure 7:
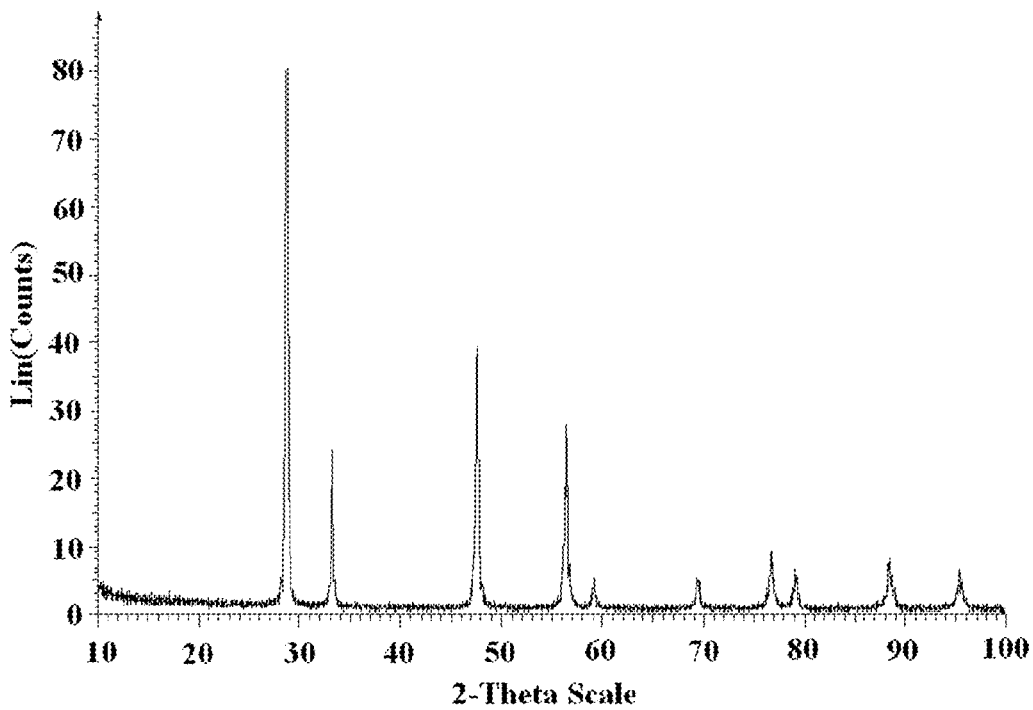
FIG. 7 shows the results of X-ray diffraction analysis on cerium oxide prepared in Examples 1 to 4.

First, crystallinity of cerium oxide prepared in the examples was confirmed from XRD data. FIG. 7 shows the results of X-ray diffraction analysis (XRD patterns) on crystalline cerium oxide prepared in Examples 1 to 4, in which the formation of crystalline cerium oxide was observed.

(2) Electron Microscope Photographs

A. Electron microscope photographs (SEM images) of the cerium carbonate-based compounds prepared in Examples 1 to 4 and Comparative Examples 1 to 3 are as shown in FIGS. 1 to 6.

Figure 8:
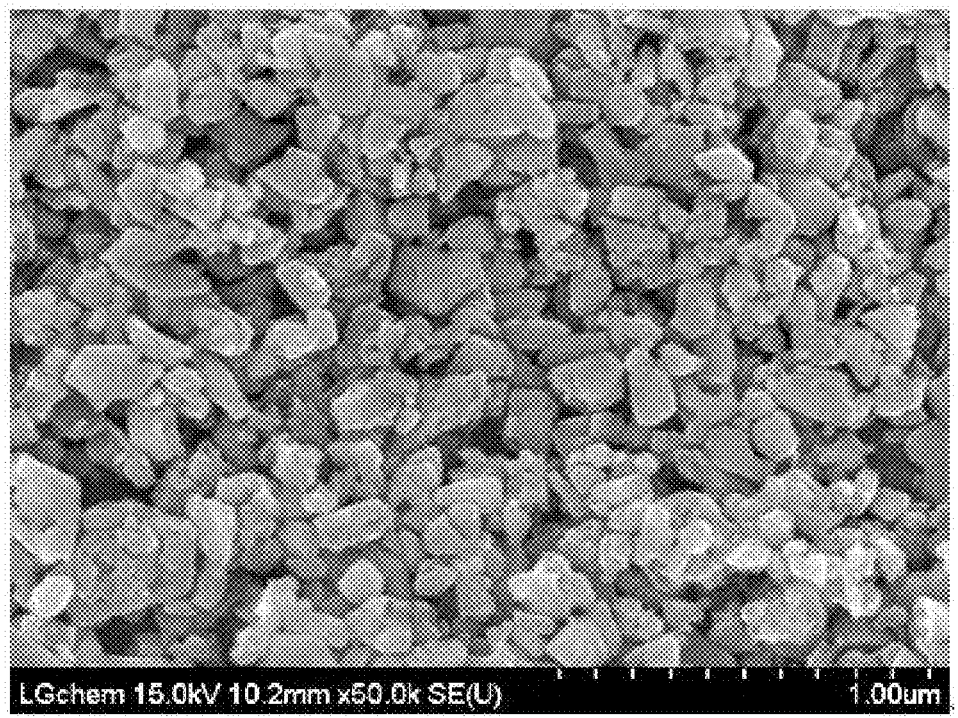
FIG. 8 is an electron microscope photograph of the cerium oxide prepared in Example 1.

B. FIGS. 8 and 10 are electron microscope photographs of the pulverized crystalline cerium oxide prepared in Examples 1 and 3, respectively, and FIG. 9 is an electron microscope photograph of the cerium oxide prepared in Comparative Example 1.

Figure 9:
FIG. 9 is an electron microscope photograph of the cerium oxide prepared in Comparative Example 1.
Figure 10:
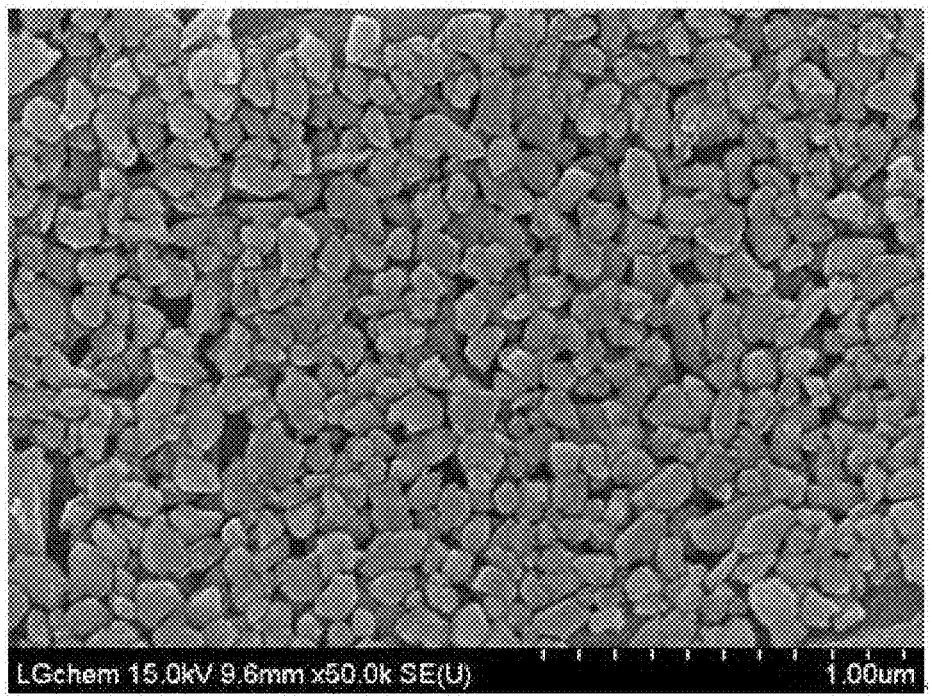
FIG. 10 is an electron microscope photograph of the cerium oxide prepared in Example 3.

When FIGS. 8 and 10 are compared with FIG. 9, each of the crystalline cerium oxides prepared in Examples 1 and 3 was found to have a uniform particle size, whereas the cerium oxide prepared in Comparative Example 1 was found to have a non-uniform particle size, indicating that the crystalline cerium oxide prepared in the examples has a narrow diameter distribution, compared to cerium oxide (Comparative Example 1) prepared by the prior method.

Figure 11:
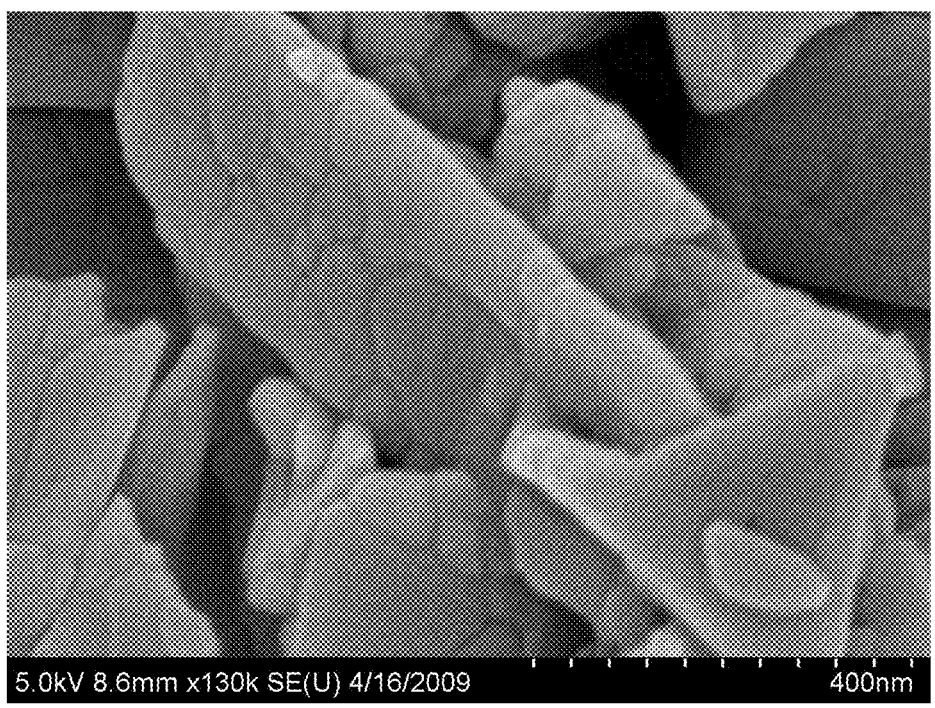
FIG. 11 is an electron microscope photograph of the cerium oxide of Example 1 before pulverization.
Figure 12:
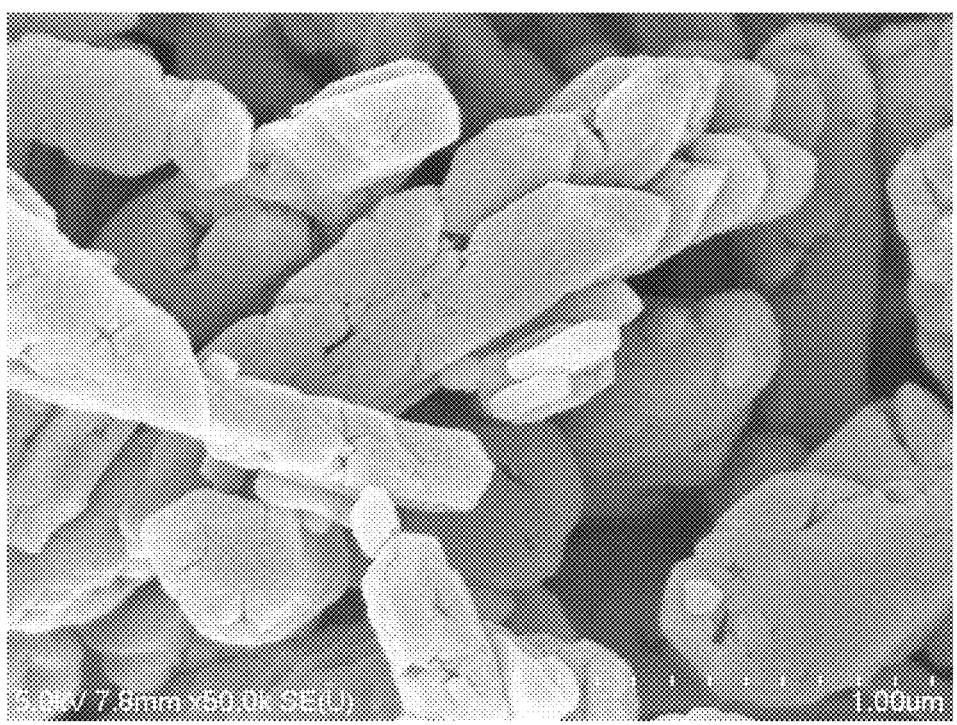
FIG. 12 is an electron microscope photograph of the cerium oxide of Example 4 before pulverization.

C. As shown in the electron microscope photographs of FIGS. 11 and 12, it was confirmed that before pulverization, the crystalline cerium oxide of Examples 1 and 4 included a plurality of cerium oxide particles, a boundary formed on each cerium oxide particle defines a plurality of crystal grains, and each crystal grain includes one or more cerium oxide crystals.

It was also confirmed that crystal grains having a size of 20 to 300 nm or 40 to 200 nm are formed on the cerium oxide particle of Examples 1 to 4.

On the contrary, a boundary is hardly formed on the cerium oxide particles of the comparative example, and no crystal grain defined by the boundary was observed.

These results indicate that the crystalline cerium oxide of the examples has a more uniform and fine diameter after pulverization, because the cerium oxide is uniformly pulverized along the crystal grain and the boundary.

Additionally, the crystal size of cerium oxide was determined by XRD analysis using the Rietveld method, and the average particle size was determined using a Horiba LA-910 laser diffraction particle size analyzer. The particle diameter distribution and standard deviation were also determined using the Horiba LA-910.

TABLE 1

|  | Amount of raw material (kg) | Amount of distilled water (kg) | Reaction temperature (° C.) | Reaction time (hr) | Crystal size of cerium oxide (nm) | Average particle size (nm) | Standard deviation (nm) | Size of crystal grain before pulverization (nm) |
|---|---|---|---|---|---|---|---|---|
| Example 1 | 23 | 140 | 180 | 2 | 52 | 93 | 10.8 | 160-200 |
| Example 2 | 70 | 140 | 180 | 2 | 54 | 93 | 12.1 | 90-150 |
| Example 3 | 70 | 140 | 120 | 3 | 71 | 92 | 9.4 | 55-90 |
| Example 4 | 70 | 140 | 80 | 24 | 69 | 92 | 10.6 | 75-130 |
| Comparative Example 1 | 69 | 32 | 180 | 2 | 55 | 94 | 13.3 | No crystal grain |
| Comparative Example 2 | 43.4 | — | 140 | 16 | 49 | 92 | 15.1 | No crystal grain |
| Comparative Example 3 | — | — | 900 | — | 79 | 84 | 39.1 | No crystal grain |

As shown in Table 1 and FIGS. 1 to 6, it was found that the reaction conditions such as the reaction temperature and reaction time of lanthanite-(Ce), and the amount of distilled water and lanthanite-(Ce) are adjusted to easily control the shape of the cerium carbonate-based compound. It was also found that cerium oxide prepared from the cerium carbonate-based compound is pulverized to obtain very uniform and fine cerium oxide power, in particular, crystalline cerium oxide having a mean volume diameter of 70 to 120 nm, preferably 70 to 95 nm, and more preferably 85 to 95 nm, and a diameter standard deviation of 8 to 12.5 nm.

On the contrary, according to Comparative Examples 1 to 3, even though cerium oxide has a relatively fine mean volume diameter due to sufficient pulverization, cerium oxide particles are not uniform due to a high standard deviation.

<Evaluation of Polishing Performance of CMP Slurry>

The polishing performance of CMP slurries (mixture of cerium oxide, dispersant, and distilled water) prepared in Examples 1 to 4 and Comparative Examples 1 to 3 was evaluated using a POLI 500 polisher, and the results are shown in Table 2. After polishing, the number of scratches on the surface of an object to be polished was detected using CS10 equipment manufactured by KLA PENCO, and a defect of 300 nm or more was regarded as a scratch to calculate the number of scratches.

TABLE 2

| Cerium oxide | Polishing result (Å/min) | Number of scratches on surface of object to be polished after polishing (ea) |
|---|---|---|
| Example 1 | 4890 | 13 |
| Example 2 | 4770 | 10 |
| Example 3 | 4657 | 7 |
| Example 4 | 4712 | 15 |
| Comparative Example 1 | 4384 | 22 |
| Comparative Example 2 | 4167 | 25 |
| Comparative Example 3 | 3789 | 41 |

With reference to Table 2, even though the CMP slurries of Examples 1 to 4 include cerium oxide powder having a particle diameter similar to that of Comparative Examples 1 to 3 as a polishing agent, they showed a much better polishing rate. The number of scratches on the surface of an object to be polished was also greatly reduced.

These results are attributed to a more uniform diameter (narrow diameter distribution and low standard deviation) of cerium oxide powder included in Examples 1 to 4, which was confirmed by the diameter distribution resulting from the measurement of average particle size, as described above. The reason why the cerium oxide powder of Examples 1 to 4 has a more uniform diameter is that a boundary and a plurality of crystal grains are formed on the cerium oxide particles before pulverization, the pulverization process is performed along the boundary, and thus cerium oxide can be more uniformly pulverized even though the same pulverization process is applied.

Further, when cerium oxide directly prepared from lanthanite-(Ce) is used in Comparative Example 3, the CMP slurry including the cerium oxide powder shows a relatively poor polishing rate, because the cerium oxide powder has a non-uniform diameter after pulverization.

The invention claimed is:

1. Sub-micron crystalline cerium oxide having a mean volume diameter of 70 to 120 nm and a diameter standard deviation of 8 to 12.5 nm after pulverization; wherein cerium oxide before pulverization has a mean volume diameter of 0.5 to 3 um, and includes a plurality of cerium oxide particles, a boundary formed on each cerium oxide particle defines a plurality of crystal grains, and each crystal grain includes one or more cerium oxide crystals.

2. The crystalline cerium oxide according to claim 1, wherein the mean volume diameter and standard deviation are values measured after pulverization using a vertical mill and a horizontal mill.

3. The crystalline cerium oxide according to claim 1, wherein before pulverization, the crystal grain has a size of 20 to 300 nm, and the cerium oxide crystal has a size of 10 to 200 nm.

4. A cerium oxide slurry comprising the crystalline cerium oxide of claim 1 as a polishing agent.

5. The cerium oxide slurry according to claim 4, further comprising a dispersant and a pH adjuster.

6. A method for preparing a crystalline cerium oxide having a mean volume diameter of 70 to 120 nm and a diameter standard deviation of 8 to 12.5 nm, comprising the steps of:
   heating lanthanite-(Ce) at 50° C. or higher to produce a cerium carbonate-based compound;
   heat-treating the cerium carbonate-based compound to produce cerium oxide; and
   pulverizing the cerium oxide.

7. The method according to claim 6, wherein the reaction of lanthanite-(Ce) is performed in a liquid-phase medium.

8. The method according to claim 7, wherein the liquid-phase medium includes water, and an aqueous solvent including alcohol, DMF, or DMSO.

9. The method according to claim 7, wherein the reaction of lanthanite-(Ce) is performed in a liquid-phase medium at a weight ratio of lanthanite-(Ce) to liquid-phase medium of 1:0.5 to 1:20.

10. The method according to claim 6, wherein the reaction of lanthanite-(Ce) is initiated at atmospheric pressure to 100 bar.

11. The method according to claim 6, wherein the heat-treatment is performed at 300 to 1500° C.

12. The method according to claim 6, wherein the pulverization is performed using a vertical mill and a horizontal mill.

* * * * *